US010424809B2

(12) United States Patent
Yoshida et al.

(10) Patent No.: US 10,424,809 B2
(45) Date of Patent: Sep. 24, 2019

(54) SECONDARY BATTERY, METHOD FOR MANUFACTURING SAME, AND BATTERY PACK EMPLOYING SAME

(71) Applicant: Sanyo Electric Co., Ltd., Daito-shi, Osaka (JP)

(72) Inventors: Shinichirou Yoshida, Hyogo (JP); Yohei Muroya, Hyogo (JP); Hiroshi Maesono, Hyogo (JP); Hiroyuki Inoue, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 259 days.

(21) Appl. No.: 15/637,076

(22) Filed: Jun. 29, 2017

(65) Prior Publication Data
US 2018/0034095 A1 Feb. 1, 2018

(30) Foreign Application Priority Data

Jul. 28, 2016 (JP) .................................. 2016-148098

(51) Int. Cl.
*H01M 10/05* (2010.01)
*H01M 2/02* (2006.01)
(Continued)

(52) U.S. Cl.
CPC ............. *H01M 10/05* (2013.01); *B60L 50/64* (2019.02); *H01M 2/0247* (2013.01); *H01M 2/08* (2013.01); *H01M 2/266* (2013.01); *H01M 4/0404* (2013.01); *H01M 4/13* (2013.01); *H01M 2/0245* (2013.01); *H01M 2/263* (2013.01);
(Continued)

(58) Field of Classification Search
None
See application file for complete search history.

(56) References Cited

U.S. PATENT DOCUMENTS 8,232,002 B2 * 7/2012 Yamauchi ............... H01M 2/22
429/178
8,603,670 B2 * 12/2013 Taniguchi ............. H01M 2/305
429/178
(Continued)

FOREIGN PATENT DOCUMENTS

| JP | 2009-87707 A | 4/2009 |
|----|--------------|--------|
| JP | 2009-87727 A | 4/2009 |
| JP | 2011-18645 A | 1/2011 |

*Primary Examiner* — Rena Dye Cronin
(74) *Attorney, Agent, or Firm* — Westerman, Hattori, Daniels & Adrian, LLP

(57) ABSTRACT

A secondary battery including an electrode body that includes a positive electrode plate and a negative electrode plate, an outer body that houses the electrode body, a metal sealing plate that seals an opening of the outer body, a positive electrode collector electrically connected to the positive electrode plate and the sealing plate, a negative electrode external terminal connected to the negative electrode plate through a negative electrode collector. In the secondary battery, a first projection and a second projection are formed on a surface of the sealing plate on a battery inner side, the positive electrode collector includes a first opening and a cut-out, the first projection is disposed in the first opening, the first projection and an edge portion of the first opening is welded and connected to each other, and the second projection is disposed in the cut-out.

15 Claims, 6 Drawing Sheets

(51) Int. Cl.
- *H01M 2/08* (2006.01)
- *H01M 2/26* (2006.01)
- *H01M 4/04* (2006.01)
- *B60L 50/64* (2019.01)
- *H01M 4/13* (2010.01)
- *H01M 10/052* (2010.01)

(52) U.S. Cl.
CPC ........ *H01M 4/0402* (2013.01); *H01M 10/052* (2013.01); *Y02T 10/7005* (2013.01); *Y02T 10/705* (2013.01)

(56) References Cited

U.S. PATENT DOCUMENTS

| | | | |
|---|---|---|---|
| 2010/0279156 A1 | 11/2010 | Kim et al. | |
| 2012/0270085 A1* | 10/2012 | Taniguchi | H01M 2/305 429/94 |
| 2016/0043380 A1* | 2/2016 | Wakimoto | H01M 2/345 429/181 |
| 2016/0254565 A1* | 9/2016 | Wakimoto | H01M 2/263 429/94 |
| 2016/0380303 A1* | 12/2016 | Minami | H01M 4/485 429/61 |

* cited by examiner

SECONDARY BATTERY, METHOD FOR MANUFACTURING SAME, AND BATTERY PACK EMPLOYING SAME

CROSS REFERENCE TO RELATED APPLICATIONS

The present invention application claims priority to Japanese Patent Application No. 2016-148098 filed in the Japan Patent Office on Jul. 28, 2016, the entire contents of which are incorporated herein by reference.

BACKGROUND OF THE INVENTION

Field of the Invention

The present disclosure relates to a secondary battery, a method for manufacturing the same, and a battery pack employing the same.

Description of Related Art

Square secondary batteries such as alkaline secondary batteries and nonaqueous electrolyte secondary batteries are used in power sources for driving electric vehicles (EV), hybrid electric vehicles (HEV, PHEV), and the like.

In such square secondary batteries, a battery case includes a bottomed cylindrical square outer body including an opening and a sealing plate that seals the opening. The battery case houses therein an electrode body including positive electrode plates, negative electrode plates, and separators, and an electrolyte. A positive electrode external terminal and a negative electrode external terminal are attached to the sealing plate with an insulating member in between. The positive electrode terminal is electrically connected to the positive electrode plates through a positive electrode collector, and the negative electrode terminal is electrically connected to the negative electrode plates through a negative electrode collector.

Furthermore, as disclosed in Japanese Published Unexamined Patent Application No. 2011-18645 (Patent Document 1), a secondary battery has been proposed in which a positive electrode collector is connected to a surface of the sealing plate on a battery inner side, and in which the battery case also serves as a positive electrode terminal. Such a configuration is advantageous in that the number of components can be reduced.

However, the method for connecting the positive electrode collector and the sealing plate to each other has not been taken into consideration in detail.

BRIEF SUMMARY OF THE INVENTION

In secondary batteries employed for, for example, power sources for driving electric vehicles (EV), hybrid electric vehicles (HEV, PHEV), and the like, the conductive path from the electrode body to the outside of the battery is required to have a strong structure that is not easily broken and damaged even when a strong impact or a vibration is applied thereto.

An object of the claimed disclosure is to provide a secondary battery that has higher reliability, a method for manufacturing the same, and a battery pack that employs the same.

A square secondary battery according to an aspect of the present disclosure includes an electrode body that includes a first electrode plate and a second electrode plate, an outer body that includes an opening, the outer body housing the electrode body, a metal sealing plate that seals the opening, a first electrode collector electrically connected to the first electrode plate, and a second electrode external terminal electrically connected to the second electrode plate, the second electrode external terminal being attached to the sealing plate while in an insulated state with respect to the sealing plate. In the secondary battery, the sealing plate includes a first projection and a second projection on a surface on a battery inner side, the first electrode collector includes a first opening, and a second opening or a cut-out, the first projection is disposed in the first opening, and the first projection and an edge portion of the first opening are welded and connected to each other, and the second projection is disposed in the second opening or the cut-out.

In the configuration described above, the sealing plate and the first electrode collector are welded and connected at the first projection and the first opening, the second projection is disposed in the second opening or the cut-out. Accordingly, even when force in a direction that rotates the first electrode collector on a plane parallel to the sealing plate is applied, a load applied to the welded connection between the first projection and the first opening can be suppressed. Accordingly, the connection between the sealing plate and the first electrode collector can be prevented from being broken and damaged, and a secondary battery with higher reliability can be obtained.

Desirably, the recess is formed in a distal end of the first projection. With the above, a larger welded connection can be formed between the first projection and the edge portion of the first opening. Accordingly, the secondary battery becomes more reliable.

Desirably, a thin wall portion is formed around the first opening. With the above, the first projection and the edge portion of the first opening can be welded and connected in a further firm manner without increasing the height of the first projection, and a portion of the sealing plate 2 in the vicinity of the first projection can be prevented from being damaged and broken.

Desirably, a collector projection that protrudes towards an electrode body side is formed in the edge portion of the first opening. With the above, a larger welded connection can be formed between the first projection and the edge portion of the first opening. Accordingly, the secondary battery becomes more reliable.

Desirably, in a surface of the sealing plate on a battery outer side, a first recess is formed at a position corresponding to the first projection, and a second recess is formed at a position corresponding to the second projection. With the above, since the first projection and the second projection are reliably formed into predetermined shapes, the sealing plate and the collector can be connected to each other in a further firm manner. Furthermore, when welding and connecting the first projection and the edge portion of the first opening to each other, since heat can be suppressed from being conducted through the sealing plate and from escaping from the vicinity of the welded portion, the first projection and the edge portion of the first opening can be welded and connected in a further firm manner.

Desirably, a gap is formed between an end portion of the second projection on a first projection side, and an edge of the second opening or the cut-out. With the above, disposition of the first projection and the second projection in the first opening provided in the first collector and the second opening or the cut-out is facilitated.

Desirably, the first electrode collector includes the cut-out, and the second projection is disposed in the cut-out.

With the above, disposition of the first projection and the second projection in the first opening provided in the first collector and the cut-out is facilitated.

Desirably, a tapered portion is formed in an end portion of the first opening on a sealing plate side. With the above, disposition of the first projection in the first opening is facilitated.

A battery pack according to an aspect of the present disclosure includes a plurality of the secondary batteries described above, in which between two adjacent secondary batteries, the negative electrode external terminal of one secondary battery, and an outer surface of the sealing plate of the other secondary battery are connected to each other with a bus bar.

In the battery pack described above, desirably, in each secondary battery, the electrode body is fixed to the outer body by being pressed from both sides by a pair of side walls of the outer body. With the above, a load can be reliably prevented from being applied to the welded connection between the sealing plate and the first electrode collector when an impact or a vibration is applied to the secondary battery.

Between two adjacent secondary batteries, desirably, the negative electrode external terminal of one secondary battery, and an outer surface of the sealing plate of the other secondary battery are connected to each other with a bus bar, and the bus bar is, desirably, welded and connected to the outer surface of the sealing plate between the first recess and the second recess. With such a configuration, the sealing plate and the bus bar can be reliably connected at a predetermined position with the first recess and the second recess serving as a marker.

A method for manufacturing a square secondary battery according to an aspect of the present disclosure, the secondary battery including an electrode body that includes a first electrode plate and a second electrode plate, an outer body that includes an opening, the outer body housing the electrode body, a metal sealing plate that seals the opening, a first electrode collector electrically connected to the first electrode plate, and a second electrode external terminal electrically connected to the second electrode plate, the second electrode external terminal being attached to the sealing plate while in an insulated state with respect to the sealing plate, in which the sealing plate includes a first projection and a second projection on a surface on a battery inner side, the first electrode collector includes a first opening, and a second opening or a cut-out, the first projection is disposed in the first opening, and the first projection and an edge portion of the first opening are welded and connected to each other, and the second projection is disposed in the second opening or the cut-out, the method including welding the first projection and the edge portion of the first opening to each other by projecting an energy ray.

In the configuration described above, the sealing plate and the first electrode collector are welded and connected at the first projection and the first opening, the second projection is disposed in the second opening or the cut-out. Accordingly, even when force in a direction that rotates the first electrode collector on a plane parallel to the sealing plate is applied, a load applied to the welded connection between the first projection and the first opening can be suppressed. Accordingly, the connection between the sealing plate and the first electrode collector can be prevented from being broken and damaged, and a secondary battery with higher reliability can be obtained.

Desirably, the method for manufacturing a secondary battery that further includes a second electrode collector connected to the second electrode external terminal and the second electrode plate, further includes fixing the first electrode collector and the second electrode collector to the sealing plate, bending, after the fixing, the first electrode collector and the second electrode collector, and welding and connecting, after the bending, the first electrode collector to the first electrode plate, and the second electrode collector to the second electrode plate.

Desirably, a pair of cut-out portions are formed in the first electrode collector at a portion where the bending is performed. With the above, a load applied to the welded connection between the sealing plate and the first electrode collector can be suppressed when the first electrode collector is bent.

The present disclosure is capable of providing a secondary battery that has higher reliability, a method for manufacturing the same, and a battery pack that employs the same.

DETAILED DESCRIPTION OF THE INVENTION

Hereinafter, a configuration of a square secondary battery 20 according to an exemplary embodiment will be described. Note that the present disclosure is not limited to the following exemplary embodiment.

Figure 1:
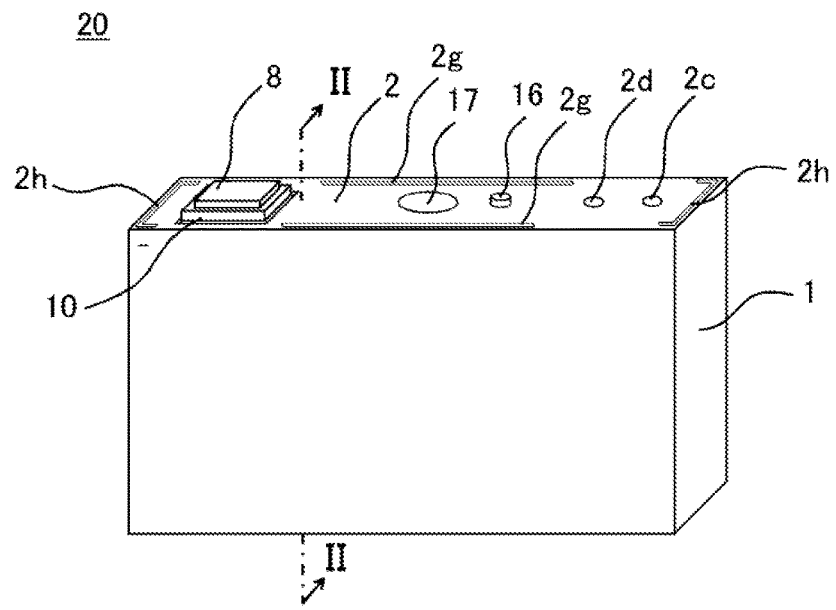
FIG. 1 is a perspective view of a square secondary battery according to an exemplary embodiment.
Figure 2:
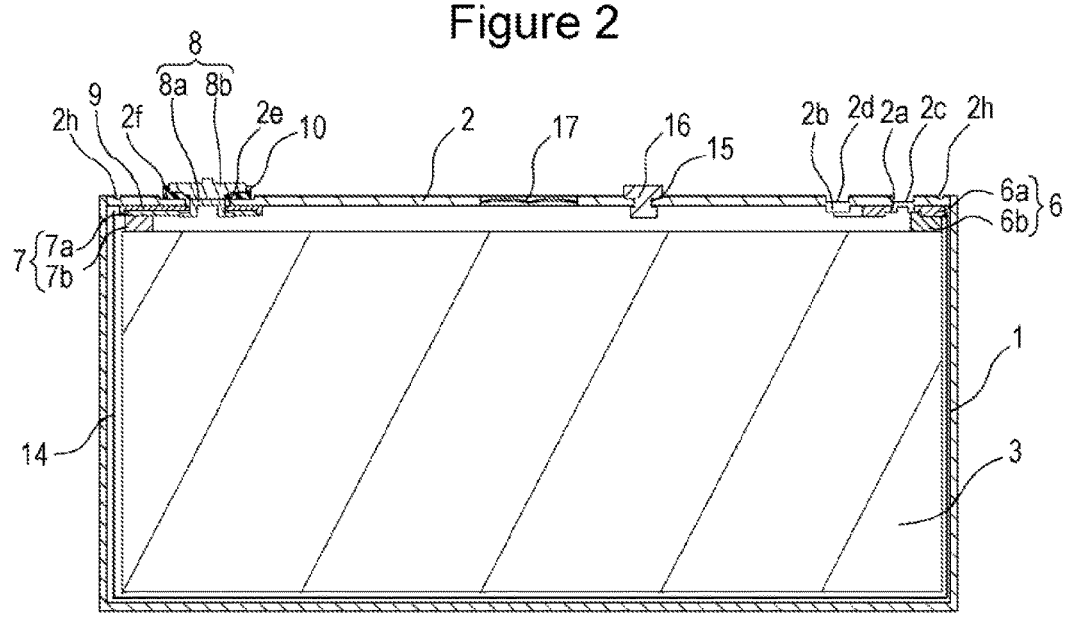
FIG. 2 is a cross-sectional view taken along line II-II in FIG. 1.

FIG. 1 is a perspective view of the square secondary battery 20. FIG. 2 is a cross-sectional view taken along line II-II in FIG. 1. As illustrated in FIGS. 1 and 2, the square secondary battery 20 includes a battery case formed of a square outer body 1 including an opening, and a sealing plate 2 that seals the opening. The outer body 1 and the sealing plate 2 are, desirably, formed of metal and are, desirably, formed of aluminum or an aluminum alloy, for example. An electrode body 3 in which at least one positive electrode plate and at least one negative electrode plate are stacked or wound with at least one separator interposed therebetween are housed in the outer body 1 together with an electrolyte. An insulation sheet 14 is disposed between the electrode body 3 and the outer body 1.

A positive electrode collector 6 is connected to the positive electrode plate constituting the electrode body 3. The positive electrode collector 6 is connected to an inner surface of the sealing plate 2. With the above, the positive electrode plate is electrically connected to the sealing plate 2 through the positive electrode collector 6. The positive electrode collector 6 is, desirably, formed of metal and is, desirably, formed of aluminum or an aluminum alloy.

A negative electrode collector 7 is connected to the negative electrode plate constituting the electrode body 3. The negative electrode collector 7 is connected to a negative electrode external terminal 8. An inner side insulating member 9 is disposed between the negative electrode collector 7 and the sealing plate 2. An external side insulating member 10 is disposed between the negative electrode external terminal 8 and the sealing plate 2. With the above, the negative electrode collector 7 and the negative electrode external terminal 8 are insulated from the sealing plate 2. The negative electrode collector 7 is, desirably, formed of metal and is, desirably, formed of copper or a copper alloy. The inner side insulating member 9 and the external side insulating member 10 are, desirably, formed of resin. The negative electrode external terminal 8 is, desirably, formed of metal and is, desirably, formed of copper or a copper alloy. Furthermore, desirably, the negative electrode external terminal 8 includes a first metal portion 8a disposed on the inner side of the battery, and a second metal portion 8b disposed on the external side of the battery. In such a case, desirably, the first metal portion 8a is formed of copper or a copper alloy, and the second metal portion is formed of aluminum or an aluminum alloy. Note that nickel plating may be applied to the surface of the negative electrode external terminal 8.

A gas discharge valve 17 that breaks when the pressure inside the battery case becomes equivalent to or larger than a predetermined value and that discharges gas inside the battery case to the outside of the battery case is provided in the sealing plate 2. An electrolyte injection hole 15 is provided in the sealing plate 2, and the electrolyte injection hole 15 is sealed with a sealing plug 16 after the electrolyte is injected inside the battery case.

A method for manufacturing the square secondary battery 20 will be described next.

Fabrication of Positive Electrode Plate

A positive electrode slurry containing lithium-nickel-cobalt-manganese composite oxide as a positive electrode active material, polyvinylidene fluoride (PVdF) as a binding agent, a carbon material as a conductive material, and N-methylpyrrolidone (NMP) is fabricated. The positive electrode slurry is coated on both surfaces of a long aluminum foil that is 15 µm thick and that serves as a positive electrode core body. Subsequently, by drying the above, the N-methylpyrrolidone in the positive electrode slurry is removed and the positive electrode active material layers are formed on the positive electrode core body. Subsequently, after compressing the positive electrode active material layers to a predetermined thickness, the positive electrode active material layers are cut into a predetermined shape.

The positive electrode plate obtained in the above manner includes a positive electrode core body exposed portion 4 in which no positive electrode active material mixture layers are formed at an end portion of the long positive electrode core body in the width direction and in the longitudinal direction on both sides of the positive electrode core body.

Fabrication of Negative Electrode Plate

A negative electrode slurry containing graphite as a negative electrode active material, styrene-butadiene rubber (SBR) as a binding agent, carboxymethyl cellulose (CMC) as a thickener, and water is fabricated. The negative electrode slurry is coated on both surfaces of a long copper foil that is 8 µm thick and that serves as the negative electrode core body. Subsequently, by drying the above, the water in the negative electrode slurry is removed and the negative electrode active material layers are formed on the negative electrode core body. Subsequently, after compressing the negative electrode active material layers to a predetermined thickness, the negative electrode active material layers are cut into a predetermined shape. The negative electrode plate obtained in the above manner includes a negative electrode core body exposed portion 5 in which no negative electrode active material mixture layers are formed at an end portion of the long negative electrode core body in the width direction and along the longitudinal direction on both sides of the negative electrode core body.

Fabrication of Electrode Body

Figure 3:
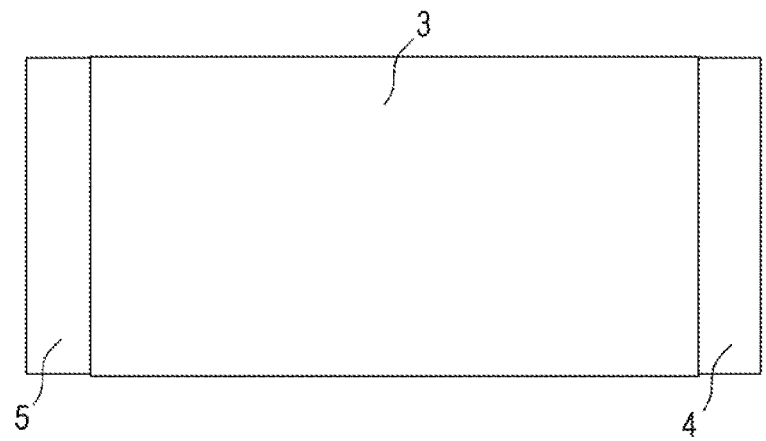
FIG. 3 is a plan view of an electrode body according to the exemplary embodiment.

The wound electrode body 3 is, with the separator interposed in between, fabricated by winding the positive electrode plate and the negative electrode plate fabricated in the above manner. As illustrated in FIG. 3, the electrode body 3 includes the wound positive electrode core body exposed portion 4 at a first end portion of the electrode body 3 in the winding axis direction, and a wound negative electrode core body exposed portion 5 at a second end portion. Note that the outermost peripheral of the electrode body 3 is, desirably, covered by the separator.

Attaching Negative Electrode Collector and Negative Electrode External Terminal to Sealing Plate In a vicinity of a terminal attachment hole 2e provided in the sealing plate 2, the inner side insulating member 9 and a base 7a of the negative electrode collector 7 are disposed on the battery inner surface side of the sealing plate 2, and the external side insulating member 10 is disposed on a battery outer surface side of the sealing plate 2. Subsequently, the negative electrode external terminal 8 is inserted through the through holes provided in the external side insulating member 10, the sealing plate 2, the inner side insulating member 9, and the base 7a of the negative electrode collector 7, and a tip of the negative electrode external terminal 8 is riveted on the base 7a of the negative electrode collector 7. With the above, the negative electrode external terminal 8, the external side insulating member 10, the inner side insulating member 9, and the negative electrode collector 7 are fixed to the sealing plate 2. Note that the riveted portion of the negative electrode external terminal 8 and the base 7a of the negative electrode collector 7 are, desirably, further welded and connected by laser welding and the like such that a welded connection 30 is formed. A third recess 2f is provided in an outer surface of the sealing plate 2 and in the vicinity of the terminal attachment hole 2e. The external side insulating member 10 is provided in the third recess 2f.

As illustrated in FIG. 2, the negative electrode external terminal 8 includes the first metal portion 8a disposed on the inner side of the battery, and the second metal portion 8b disposed on the external side of the battery. The first metal portion 8a is desirably formed of copper or a copper alloy. Desirably, the second metal portion 8b is formed of aluminum or an aluminum alloy. With such a configuration, a bus bar formed of aluminum or an aluminum alloy may be suitably used as a bus bar electrically connecting the secondary batteries to each other. Note that a nickel layer is formed on the surface of the first metal portion 8a.

Attaching Positive Electrode Collector to Sealing Plate

Figure 6:
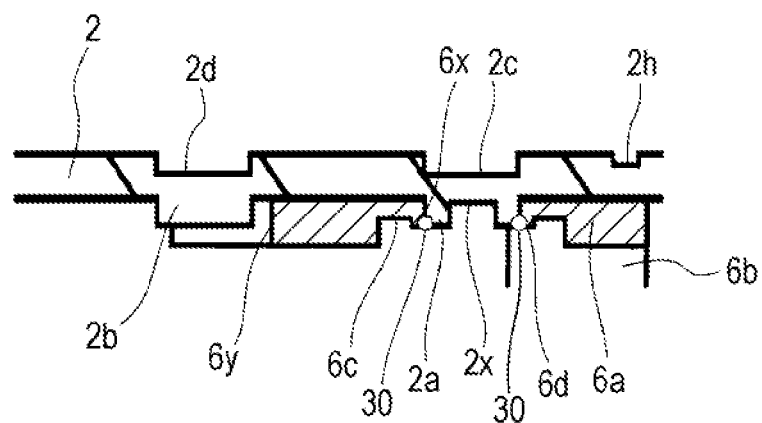
FIG. 6 is an enlarged cross-sectional view of a portion near a connection between the sealing plate and a positive electrode collector taken in a longitudinal direction of the sealing plate.
Figure 7:
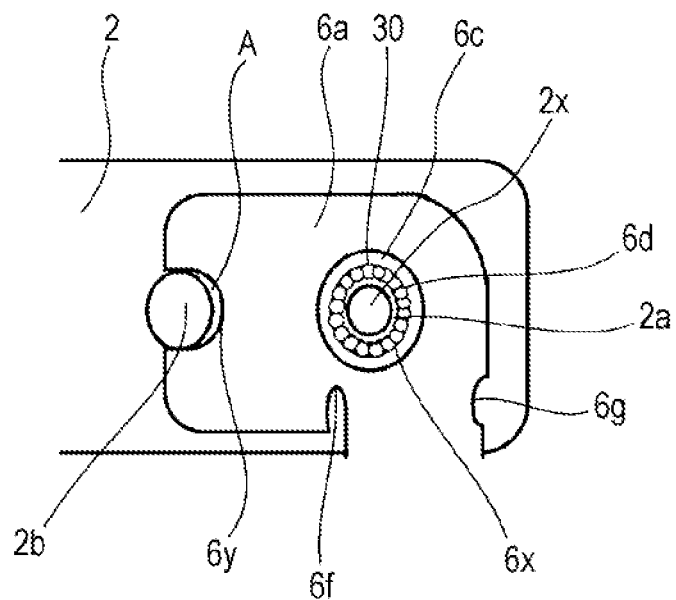
FIG. 7 is an enlarged bottom view of the portion near the connection between the sealing plate and the positive electrode collector.

As illustrated in FIGS. 6 and 7, a first projection 2a and a second projection 2b are formed on a surface of the sealing plate 2 on the battery inner side. Furthermore, a first opening 6x and a cut-out 6y are formed in a base 6a of the positive electrode collector 6. The first projection 2a of the sealing plate 2 is disposed in the first opening 6x of the positive electrode collector 6, and the second projection 2b of the sealing plate 2 is disposed in the cut-out 6y of the positive electrode collector 6. Furthermore, the first projection 2a of the sealing plate 2 and an edge portion of the first opening 6x of the positive electrode collector 6 are welded to each other by projecting an energy ray such as laser. With the above, the welded connection 30 is formed. Note that as illustrated in FIG. 7, desirably, the welded connection 30 is formed on the entire periphery of the first opening 6x. However, the welded connection 30 do not necessarily have to be formed on the entire periphery of the first opening 6x.

Note that a tip of the first projection 2a may be riveted on the base 6a of the positive electrode collector 6. Furthermore, the riveted portion may be welded and connected to the base 6a. With the above, the sealing plate 2 and the positive electrode collector 6 can be connected to each other in a further firm manner.

A distal end recess 2x is formed on a distal end side of the first projection 2a of the sealing plate 2. With the above, a larger welded connection 30 can be formed in a reliable manner between the first projection 2a and the edge portion of the first opening 6x. Accordingly, the sealing plate 2 and the positive electrode collector 6 can be connected to each other in a further firm manner, such that a highly reliable secondary battery is obtained.

An annular thin wall portion 6c is formed around the first opening 6x of the base 6a of the positive electrode collector 6. Note that the thin wall portion 6c is formed such that the surface on the electrode body 3 side of the base 6a of the positive electrode collector 6 is recessed. Furthermore, a collector projection 6d the protrudes towards the electrode body 3 side is formed in the edge portion of the first opening 6x. With the above, an annular groove is formed on the outside of the collector projection 6d. Furthermore, the collector projection 6d and the edge portion of the first opening 6x are welded and connected to each other. With the above, a larger welded connection 30 can be formed in a reliable manner between the first projection 2a and the first opening 6x. Accordingly, the sealing plate 2 and the positive electrode collector 6 can be connected to each other in a further firm manner, such that a highly reliable secondary battery is obtained.

As illustrated in FIG. 6, desirably, a height of the first projection 2a is smaller than a thickness of the base 6a of the positive electrode collector 6. With such a configuration, the sealing plate 2 can be prevented from being broken and damaged in the vicinity of the first projection 2a.

Desirably, the first projection 2a is provided in the sealing plate 2 by pressing. Furthermore, desirably, a first recess 2c is, in the sealing plate 2, formed on a back surface side of the first projection 2a. In such a case, if the height of the first projection 2a is excessively large, the wall thickness of the sealing plate 2 in the vicinity of the first projection 2a tends to become small, and there is a concern that there is a decrease in the strength in the vicinity of the first projection 2a. Accordingly, there is a concern that the portion in the vicinity of the first projection 2a of the sealing plate 2 may become damaged and broken by a strong impact or vibration. Accordingly, the height of the first projection 2a is, desirably, smaller than the thickness of the base 6a of the positive electrode collector 6.

Figure 8:
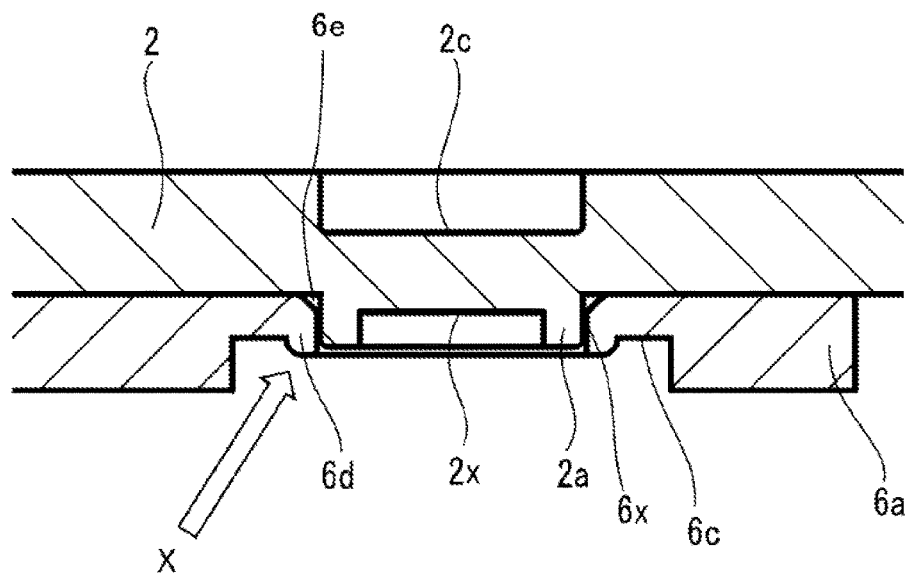
FIG. 8 is an enlarged cross-sectional view of a first projection and a first opening before the welded connection is carried out.
Figure 9:
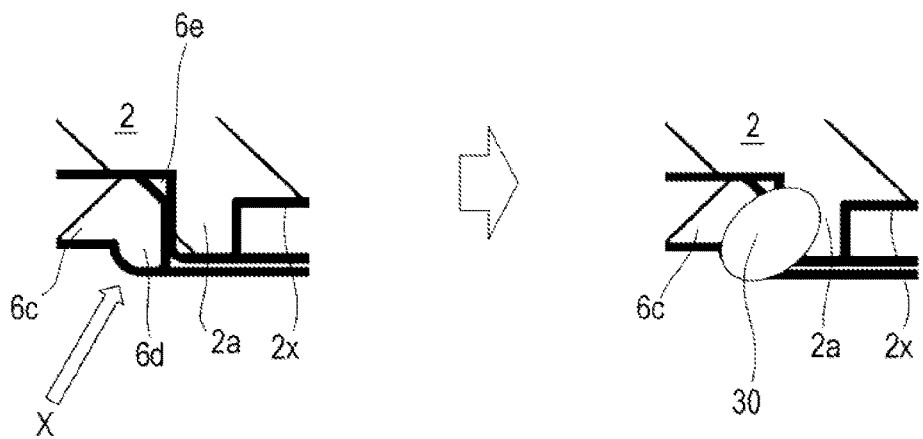
FIG. 9 illustrates enlarged cross-sectional views of the vicinity of the first projection and the first opening, and illustrates diagrams depicting the vicinity of the first projection and the first opening before and after carrying out the welded connection.

FIG. 8 is an enlarged cross-sectional view of the first projection 2a and the first opening 6x before the welded connection is carried out. FIG. 9 illustrates enlarged cross-sectional views of the vicinity of the first projection 2a and the first opening 6x, and illustrates diagrams depicting the vicinity of the first projection 2a and the first opening 6x before and after carrying out the welded connection. As illustrated in FIG. 8, desirably, an end portion of the collector projection 6d on the electrode body 3 side protrudes more towards the electrode body 3 side than the end portion of the first projection 2a on the electrode body 3 side.

Desirably, the welded connection 30 is formed by projecting an energy ray such as laser to the collector projection 6d and the first projection 2a in a direction indicated by an arrow X in FIGS. 8 and 9. As described above, desirably, the energy ray is projected to the collector projection 6d in an inclined direction with respect to a direction perpendicular to the sealing plate 2. Desirably, the first projection 2a and the edge portion of the first opening 6x are welded and connected to each other by projecting a larger dose of energy ray to the collector projection 6d side of the positive electrode collector 6 than to the first projection 2a of the sealing plate 2 such that the collector projection 6d side of the positive electrode collector 6 is melted more than the first projection 2a of the sealing plate 2. With the above, the first projection 2a and the edge portion of the first opening 6x can be welded and connected to each other in a further firm manner.

A tapered portion 6e is formed in an upper end (an end portion on the sealing plate 2 side) of the first opening 6x provided in the base 6a of the positive electrode collector 6. With the above, the first projection 2a can be inserted into the first opening 6x easily.

Figure 5:
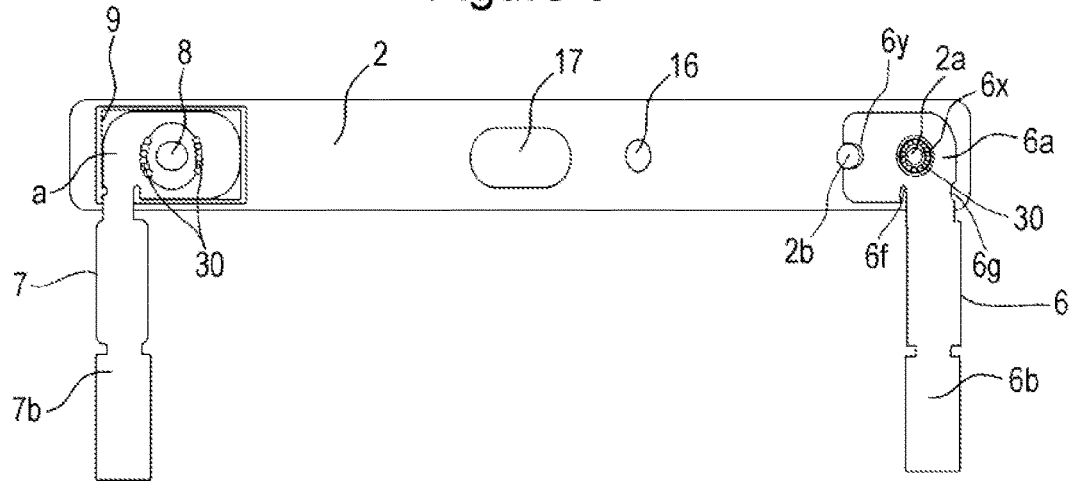
FIG. 5 is a bottom view of the sealing plate after the components have been attached.

As illustrated in FIGS. 5 to 7, the second projection 2b provided in the sealing plate 2 is disposed inside the cut-out 6y provided in the base 6a of the positive electrode collector 6. With the above, a load in a rotational direction on a plane parallel to the sealing plate 2 can be prevented from being applied to the welded connection 30 formed between the first projection 2a of the sealing plate 2 and the edge portion of the first opening 6x provided in the base 6a of the positive electrode collector 6. With the above, the welded connection 30 formed between the first projection 2a and the edge portion of the first opening 6x can be prevented from being damaged and broken. Accordingly, the secondary battery becomes more reliable.

Figure 10:
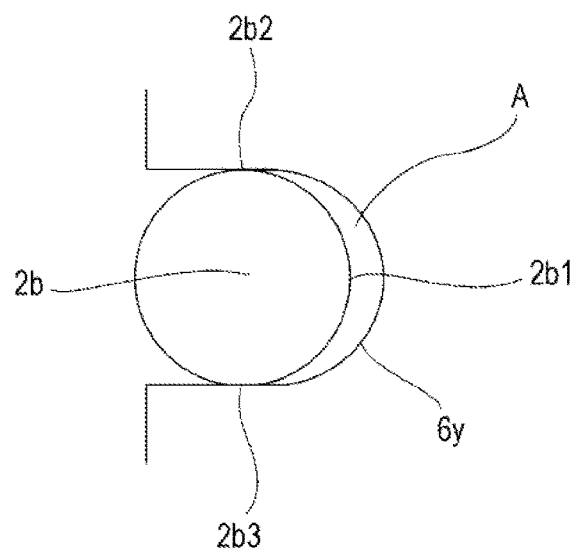
FIG. 10 is a top view of a second projection and a cut-out.

The first projection 2a and the second projection 2b of the sealing plate 2 are disposed so as to be aligned in the longitudinal direction of the sealing plate 2. As illustrated in FIGS. 7 and 10, desirably, a gap A is, in the longitudinal direction of the sealing plate 2, formed between an end portion 2b1 of the second projection 2b on the first projection 2a side and an edge portion of the cut-out 6y provided in the base 6a of the positive electrode collector 6. With the above, the welded connection 30 formed between the first projection 2a and the edge portion of the first opening 6x can be prevented from being damaged and broken, and the secondary battery becomes one in which the first projection 2a and the second projection 2b can be inserted into the first opening 6x and the cut-out 6y easily.

In the longitudinal direction of the sealing plate 2, desirably, the distance between the end portion 2b1 of the second projection 2b on the first projection 2a side and the edge portion of the cut-out 6y provided in the positive electrode collector 6 is preferably 0.5 mm or more and, more preferably, is 1 mm or more. In the longitudinal direction of the sealing plate 2, the distance between the end portion 2b1 of the second projection 2b on the first projection 2a side and the edge portion of the cut-out 6y provided in the positive electrode collector 6 is preferably 10 mm or less and, more preferably, is 5 mm or less.

In the short direction of the sealing plate 2, the distance between an end portion 2b2 on a first side of the second projection 2b and the edge portion of the cut-out 6y provided in the positive electrode collector 6 is preferably smaller than 0.5 mm, more preferably is 0.3 mm or smaller, and most preferably is 0.1 mm or smaller. In the short direction of the sealing plate 2, the distance between an end portion 2b3 of the second projection 2b on a second side and the edge portion of the cut-out 6y provided in the positive electrode collector 6 is preferably smaller than 0.5 mm, more preferably is 0.3 mm or smaller, and most preferably is 0.1 mm or smaller. Note that the end portion 2b2 on the first side of the second projection 2b and the end portion 2b3 on the second side are, desirably, in contact with the cut-out 6y provided in the positive electrode collector 6.

The second projection 2b of the sealing plate 2 can be welded and connected to the edge portion of the cut-out 6y provided in the base 6a of the positive electrode collector 6.

Figure 4:
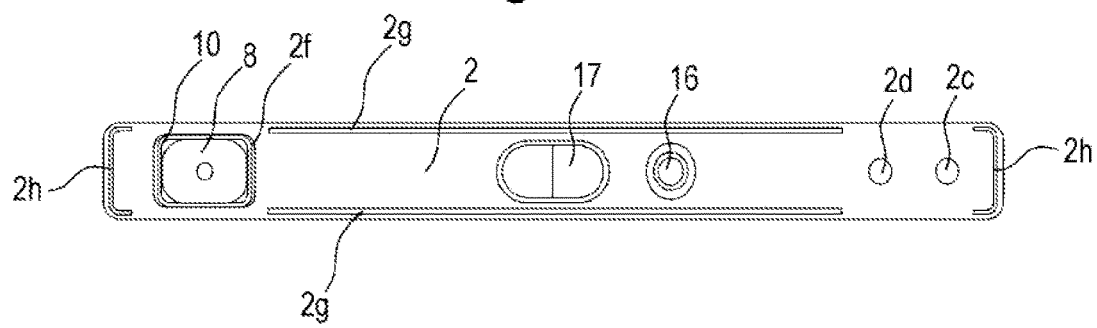
FIG. 4 is a top view of a sealing plate after components have been attached.

As illustrated in FIGS. 4 and 5, desirably, the first recess 2c is formed in the outer surface of the sealing plate 2 at a position opposing the first projection 2a. Desirably, a second recess 2d is formed in the outer surface of the sealing plate 2 at a position opposing the second projection 2b. Furthermore, desirably, a first end of the bus bar that electrically connects two adjacent square secondary batteries 20 to each other is connected to a negative electrode external terminal 8 of one of the square secondary battery 20, and a second end of the bus bar is welded and connected to a portion between the first recess 2c and the second recess 2d of the sealing plate 2 of the other square secondary battery 20. With such a configuration, the bus bar can be reliably connected to a predetermined position in a surface of the sealing plate 2 on the battery outer side.

A pair of first grooves 2g and a pair of second grooves 2h are formed on the surface of the sealing plate 2 on the battery outer side. The first grooves 2g are provided in the vicinity of the end portions of the sealing plate 2 in the short direction so as to extend in the longitudinal direction of the sealing plate 2. The electrolyte injection hole 15 and the gas discharge valve 17 are provided between the pair of first grooves 2g. The second grooves 2h are provided in the vicinity of the end portions of the sealing plate 2 in the longitudinal direction so as to extend in the short direction of the sealing plate 2. The two ends of each of the second grooves 2h are bent such that the groove extend in the longitudinal direction of the sealing plate 2.

In the longitudinal direction of the sealing plate 2, the first recess 2c and the second recess 2d are formed between the first grooves 2g and the second grooves 2h. A line that extends in the short direction of the sealing plate 2 and that passes through the center of the first recess 2c does not intersect the first grooves 2g nor the second grooves 2h. A line that extends in the short direction of the sealing plate 2 and that passes through the center of the second recess 2d does not intersect the first grooves 2g nor the second grooves 2h.

Bending of Positive Electrode Collector and Negative Electrode Collector

As illustrated in FIG. 5, the positive electrode collector 6 and the negative electrode collector 7 are desirably tabular when attached to the sealing plate 2. The positive electrode collector 6 attached to the sealing plate 2 is bent at a boundary between the base 6a and a lead portion 6b. With the above, the positive electrode collector 6 is formed into a shape in which the lead portion 6b is bent at an end portion of the base 6a in the short direction of the sealing plate 2. Furthermore, the negative electrode collector 7 attached to the sealing plate 2 is bent at the boundary between the base 7a and a lead portion 7b. With the above, the negative electrode collector 7 is formed into a shape in which the lead portion 7b is bent at an end portion of the base 7a in the short direction of the sealing plate 2. Note that in the positive electrode collector 6, a pair of cut-out portions 6f and 6g are formed on the two ends of the boundary between the base 6a and the lead portion 6b. With the above, a load applied to the welded connection 30 between the sealing plate 2 and the positive electrode collector 6 can be suppressed when the positive electrode collector 6 is bent. Furthermore, when the positive electrode collector 6 is bent, desirably, the positive electrode collector 6 is bent while the base 6a of the positive electrode collector 6 is pressed towards the sealing plate 2. With the above, a load can be prevented from being applied to the welded connection 30 formed between the first projection 2a of the sealing plate 2 and the edge portion of the first opening 6x of the positive electrode collector 6.

Connecting Positive Electrode Collector and Negative Electrode Collector to Electrode Body The lead portion 6b of the positive electrode collector 6 is welded and connected to the outermost surface of the positive electrode core body exposed portion 4 wound around the electrode body 3. The lead portion 7b of the negative electrode collector 7 is welded and connected to the outermost surface of the negative electrode core body exposed portion 5 wound around the electrode body 3. Note that the joining method may include resistance welding, ultrasonic welding, laser welding, for example.

Assembling Secondary Battery

The electrode body 3 connected to the sealing plate 2 through the positive electrode collector 6 and the negative electrode collector 7 is covered therearound with the insulation sheet 14. Subsequently, the electrode body 3 covered with the insulation sheet 14 is inserted into the outer body 1. Furthermore, an opening of the outer body 1 is sealed with the sealing plate 2 by laser welding the outer body 1 and the sealing plate 2. Subsequently, a nonaqueous electrolyte containing a nonaqueous solvent and electrolyte salt is injected into the electrolyte injection hole 15 provided in the sealing plate 2, and the electrolyte injection hole 15 is sealed with the sealing plug 16. Desirably, a blind rivet is used for the sealing plug 16. Note that a metal sealing plug 16 can be welded and connected to the sealing plate 2.

Battery Pack

Figure 11:
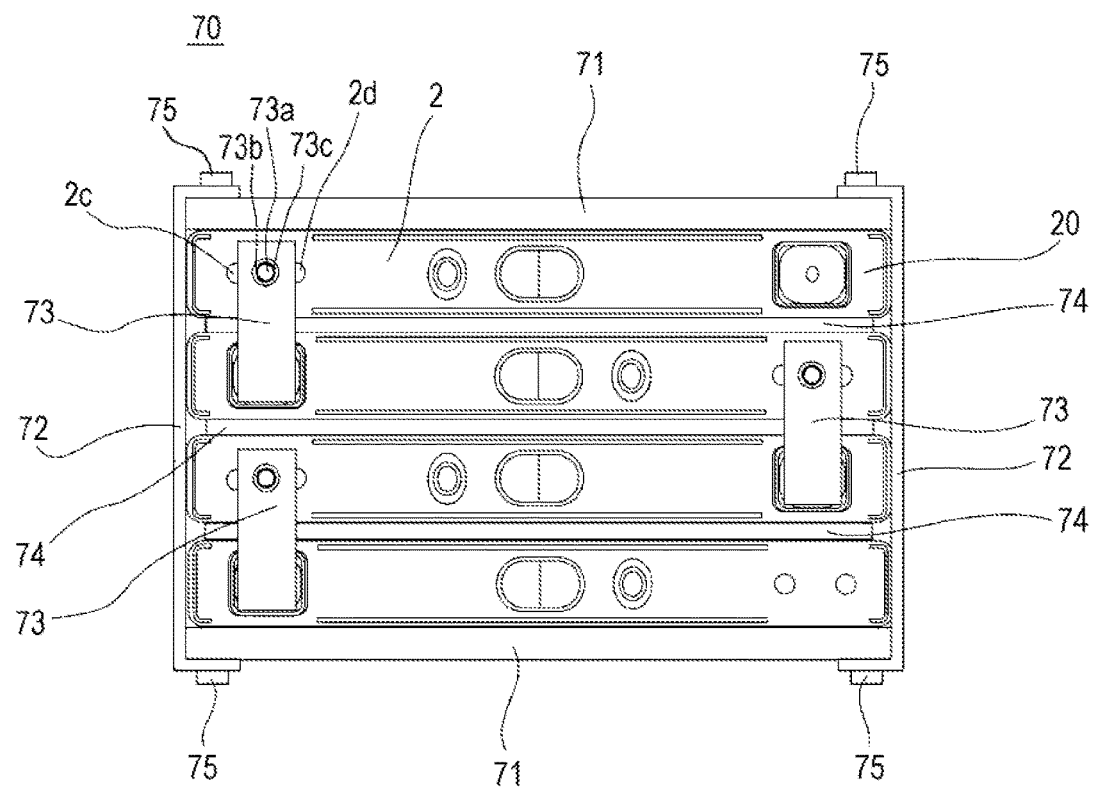
FIG. 11 is a top view of a battery pack.

FIG. 11 is a top view of a battery pack 70 employing a plurality of square secondary batteries 20. A plurality of square secondary batteries 20 are stacked between a pair of metal end plates 71. Intercell spacers 74 formed of resin are each disposed between the square secondary batteries 20. The pairs of end plates 71 are connected to each other with a pair of metal bind bars 72. Note that the bind bars 72 are fixed to the end plates 71 with securing members 75.

Desirably, the securing members 75 are bolts, rivets, or the like. Note that the bind bars 72 can be welded and connected to the end plates 71 without using the securing members 75.

In the square secondary batteries 20 that are adjacent to each other, the negative electrode external terminal 8 of one of the square secondary battery 20, and the outer surface of the sealing plate 2 of the other square secondary battery 20 are connected to each other through a metal bus bar 73. Note that, desirably, the bus bar 73 is formed of aluminum or an aluminum alloy. The bus bar 73 is, desirably, welded and connected to the outer surface of the sealing plate 2 between the first recess 2c and the second recess 2d. With such a configuration, the sealing plate 2 and the bus bar 73 can be reliably connected at a predetermined position with the first recess 2c and the second recess 2d serving as a marker.

The bus bar 73 includes a bus bar opening 73a. Furthermore, a bus bar thin wall portion 73b is formed around the bus bar opening 73a. Furthermore, an edge portion of the bus bar opening 73a is welded to the sealing plate 2 by laser welding or the like such that a welded connection 73c is formed.

In the battery pack 70, desirably, the electrode body 3 of each square secondary battery 20 is fixed to the outer body 1 by being pressed from both sides with the pair of side walls (the side walls on the large area side) of the corresponding outer body 1. With the above, a load can be reliably prevented from being applied to the welded connection 30 between the sealing plate 2 and the positive electrode collector 6 when an impact or a vibration is applied to the square secondary battery 20.

First Modification

In the exemplary embodiment described above, an example is given in which the cut-out 6y is provided in the base 6a of the positive electrode collector 6, and the second projection 2b of the sealing plate 2 is disposed in the cut-out 6y. Instead of providing the cut-out in the positive electrode collector, a second opening may be provided and the second projection of the sealing plate may be disposed in the second opening.

Figure 12:
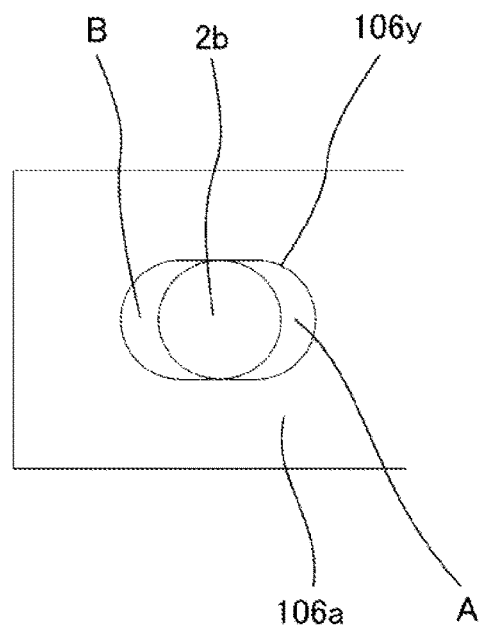
FIG. 12 is an enlarged view of a vicinity of a second projection and a second opening of a square secondary battery according to a first modification.

FIG. 12 is an enlarged view of the vicinity of the second projection and a second opening of the square secondary battery according to a first modification. As illustrated in FIG. 12, a second opening 106y is provided in a base 106a of the positive electrode collector. Note that in such a case as well, in the longitudinal direction of the sealing plate 2, the gap A is, desirably, formed between an end portion of the second projection 2b on the first projection side (the right side in FIG. 12) and the edge portion of the second opening 106y. Furthermore, in the longitudinal direction of the sealing plate 2, a gap B is, desirably, formed between an end portion of the second projection 2b on a side (the left side in FIG. 12) opposite to the first projection side and the edge portion of the second opening 106y.

Second Modification

Figure 13:
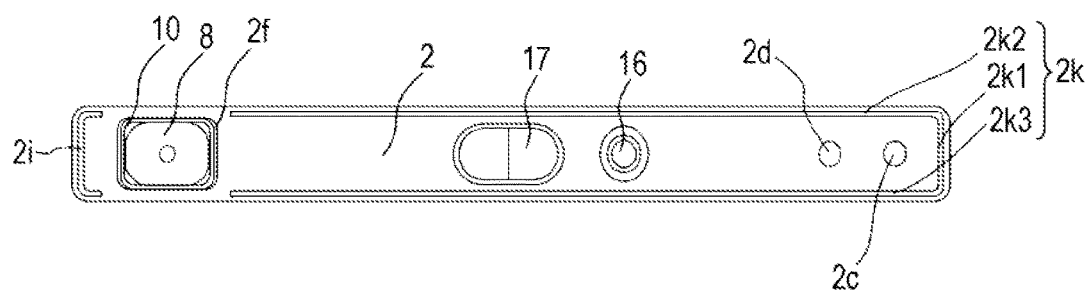
FIG. 13 is a top view of a sealing plate according to a second modification after components have been attached.

FIG. 13 is a top view of a square secondary battery according to a modification and is a diagram corresponding to FIG. 4. In the square secondary battery according to the second modification, shapes of grooves formed in the outer surface of the sealing plate 2 are different from those of the square secondary battery 20 described above. As illustrated in FIG. 13, in the square secondary battery according to the second modification, a third groove 2i and a fourth groove 2k are provided in the outer surface of the sealing plate 2.

Furthermore, in the longitudinal direction of the sealing plate 2, the negative electrode external terminal 8 is disposed between the third groove 2i and the fourth groove 2k.

The fourth groove 2k includes a groove first area 2k1 that extends in the short direction of the sealing plate 2, groove second area 2k2 that extends in the longitudinal direction of the sealing plate 2 from a first end portion of the groove first area 2k1, and a groove third area 2k3 that extends in the longitudinal direction of the sealing plate 2 from a second end portion of the groove first area 2k1.

As described above, by having the grooves formed in the vicinity of the outer peripheral edge throughout substantially the entire periphery of the outer surface of the sealing plate 2, the sealing plate 2 and the outer body 1 can be welded and connected in a further firm manner.

Note that in the battery pack including the plurality of secondary batteries, desirably, the position where the welded connection between the sealing plate 2 and the bus bar is formed is between the first recess 2c and the second recess 2d in the longitudinal direction of the sealing plate 2, and is between the two grooves in the short direction of the sealing plate 2. With the above, when welding and connecting the bus bar to the outer surface of the sealing plate 2, heat can be suppressed from escaping through the sealing plate 2, and the bus bar and the sealing plate 2 can be welded and connected to each other in a further reliable and firm manner.

(Others)

In the exemplary embodiment described above, an example in which the positive electrode collector is connected to the sealing plate has been described; however, the negative electrode collector can be connected to the sealing plate 2. In such a case, a positive electrode external terminal is used, and the positive electrode external terminal, the positive electrode collector, and the sealing plate are insulated with an insulating member.

The positive electrode external terminal can be connected to the other side (the outer surface side) of a portion on a surface of the sealing plate on the battery inner side to where the positive electrode collector is connected.

The configuration of the electrode body 3 is not particularly limited to the above configuration. The electrode body 3 may be a wound electrode body or may be a stacked electrode body.

The positive electrode plate, the negative electrode plate, the separator, the electrolyte, and the like may have known configurations.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
   an electrode body that includes a first electrode plate and a second electrode plate;
   an outer body that includes an opening, the outer body housing the electrode body;
   a metal sealing plate that seals the opening;
   a first electrode collector electrically connected to the first electrode plate; and
   a second electrode external terminal electrically connected to the second electrode plate, the second electrode external terminal being attached to the sealing plate while in an insulated state with respect to the sealing plate, wherein the sealing plate includes a first projection and a second projection on a surface on a battery inner side, wherein the first electrode collector includes a first opening, and a second opening or a cut-out, wherein the first projection is disposed in the first opening, and the first projection and an edge portion of the first opening are welded and connected to each other, and wherein the second projection is disposed in the second opening or the cut-out.

2. The secondary battery according to claim 1, wherein a recess is formed in a distal end of the first projection.

3. The secondary battery according to claim 1, wherein a thin wall portion is formed around the first opening.

4. The secondary battery according to claim 1, wherein a collector projection that protrudes towards an electrode body side is formed in the edge portion of the first opening.

5. The secondary battery according to claim 1, wherein, in a surface of the sealing plate on a battery outer side, a first recess is formed at a position corresponding to the first projection, and a second recess is formed at a position corresponding to the second projection.

6. The secondary battery according to claim 1, wherein a gap is formed between an end portion of the second projection on a first projection side, and an edge of the second opening or the cut-out.

7. The secondary battery according to claim 1, wherein the first electrode collector includes the cut-out, and the second projection is disposed in the cut-out.

8. The secondary battery according to claim 1, wherein a tapered portion is formed in an end portion of the fiust opening on a sealing plate side.

9. A battery pack comprising:
a plurality of the secondary batteries according to claim 1,
wherein between two adjacent secondary batteries, the negative electrode external terminal of one secondary battery, and an outer surface of the sealing plate of the other secondary battery are connected to each other with a bus bar.

10. The battery pack according to claim 9, wherein in each secondary battery, the electrode body is fixed to the outer body by being pressed from both sides by a pair of side walls of the outer body.

11. A battery pack comprising:
a plurality of the secondary batteries according to claim 5, wherein between two adjacent secondary batteries, the negative electrode external terminal of one secondary battery, and an outer surface of the sealing plate of the other secondary battery are connected to each other with a bus bar, and wherein the bus bar is welded and connected to the outer surface of the sealing plate between the first recess and the second recess.

12. A method for manufacturing a secondary battery that includes an electrode body that includes a first electrode plate and a second electrode plate, an outer body that includes an opening, the outer body housing the electrode body, a metal sealing plate that seals the opening, a first electrode collector electrically connected to the first electrode plate, and a second electrode external terminal electrically connected to the second electrode plate, the second electrode external terminal being attached to the sealing plate while in an insulated state with respect to the sealing plate, in which the sealing plate includes a first projection and a second projection on a surface on a battery inner side, the first electrode collector includes a first opening, and a second opening or a cut-out, the first projection is disposed in the first opening, and the first projection and an edge portion of the first opening are welded and connected to each other, and the second projection is disposed in the second opening or the cut-out, the method comprising:
welding the first projection and the edge portion of the first opening to each other by projecting an energy ray.

13. The method for manufacturing a secondary battery according to claim 12 further including a second electrode collector connected to the second electrode external terminal and the second electrode plate, the method further comprising:
fixing the first electrode collector and the second electrode collector to the sealing plate;
bending, after the fixing, the first electrode collector and the second electrode collector; and
welding and connecting, after the bending, the first electrode collector to the first electrode plate, and the second electrode collector to the second electrode plate.

14. The method for manufacturing a secondary battery according to claim 12,
wherein a pair of cut-out portions are formed in the first electrode collector at a portion where the bending is performed.

15. The method for manufacturing a secondary battery according to claim 12,
wherein a tapered portion is formed in an end portion of the first opening on a sealing plate side.

* * * * *